United States Patent

Brocheton et al.

[11] Patent Number: 6,162,749
[45] Date of Patent: Dec. 19, 2000

[54] PHOTOCHROMIC GLASSES

[75] Inventors: Yves Andre Henri Brocheton, Fontenay-sous-Bois; Michel Prassas, Vulaines S/Seine, both of France

[73] Assignee: Corning S.A., Avon Cedex, France

[21] Appl. No.: 09/355,519

[22] PCT Filed: Jan. 29, 1998

[86] PCT No.: PCT/US98/01640

§ 371 Date: Jul. 29, 1999

§ 102(e) Date: Jul. 29, 1999

[87] PCT Pub. No.: WO98/33747

PCT Pub. Date: Aug. 6, 1998

Related U.S. Application Data

[60] Provisional application No. 60/038,716, Mar. 7, 1997.

[30] Foreign Application Priority Data

Feb. 7, 1997 [FR] France .................. 97 01164

[51] Int. Cl.⁷ .................. C03C 4/06; C03C 4/02
[52] U.S. Cl. .................. 501/13; 501/56; 501/63; 501/64; 501/67
[58] Field of Search .................. 501/13, 56, 63, 501/64, 67

[56] References Cited

U.S. PATENT DOCUMENTS

| | | | |
|---|---|---|---|
| 3,208,860 | 9/1965 | Armistead et al. | 501/13 |
| 4,980,318 | 12/1990 | Araujo | 501/13 |
| 5,244,845 | 9/1993 | Kerko et al. | 501/13 |
| 5,426,077 | 6/1995 | Brocheton et al. | 501/13 |
| 5,482,901 | 1/1996 | Morgan et al. | 501/13 |

*Primary Examiner*—Karl Group
*Attorney, Agent, or Firm*—Milton M. Peterson

[57] ABSTRACT

The invention concerns photochromic glasses with improved properties having the following composition, in wt. %: $SiO_2$: 51–66, $B_2O_3$: 15–23, $Al_2O_3$: 3–10, $ZrO_2$: 2.5–11, $TiO_2$: 0–1, $Li_2O$: 3–7, $Na_2O$: 0–8, $K_2O$: 2–9, Ag: 0.080–0.30, CuO>0.0020–0.0130, Cl: 0.1–0.6, Br 0.040–0.3, MgO: 0–3, CaO: 0–3, SrO: 0–3, BaO: 0–3, $Nb_2O_5$: 0–1, $La_2O_3$: 0–8, $Y_2O_3$: 0–8, with $0.2 < Ag/(Cl+Br) \leq 0.5$, $Br/(Cl+Br) > 0.15$, $0.5 \leq La_2O_3 + Y_2O_3 \leq 8$, $TiO_2 + Nb_2O_5 \leq 1.2$, $10 \leq Al_2O_3 + ZrO_2 \leq 17$, $MgO+CaO+SrO+BaO \leq 6$. Use for the production of ophthalmic lenses.

8 Claims, No Drawings

PHOTOCHROMIC GLASSES

This application claims benefit to Provisional Application 60/038,716 filed Mar. 7, 1997.

FIELD OF THE INVENTION

The invention relates to photochromic glasses, for ophthalmic use, characterized by a high transmission and by the absence of coloration in the clear state, by the ability to darken in the presence of an actinic radiation source to a low level of transmission, by a low thermal dependence of the darkening level, and by a return to a high transmission when the light source is eliminated. These glasses are also characterized by a good stability of the photochromic properties with respect to the thermal treatment used in the antiglare treatments frequently applied to photochromic lenses.

BACKGROUND OF THE INVENTION

The photochromic glasses are now well known and are characterized by their ability to darken when exposed to actinic radiation, essentially ultraviolet radiation, and to brighten when this excitatory source disappears. Since the invention of these glasses (U.S. Pat. No. 3,208,860), now some 30 years ago, they have been applied with variations in a great number of versions, depending on whether one or the other of the attributes of photochromism was optimized for particular application. In general, the critical attributes of the photochromic glasses for ophthalmic applications are: their color and level of transmission in the clear state (in the absence of actinic radiation), their color (usually gray or brown) and transmission after darkening resulting from exposure to actinic radiation, the low amplitude of the variation in the level of transmission in the darkened state as a function of the temperature, normally between 0 and 40° C., and their ability to brighten reversibly when the excitatory light source disappears.

For example, U.S. Pat. No. 4,746,633 describes glasses for ophthalmic use, having a transmission in the clear state of more than 88% and a transmission of 35–60% after 15 min of exposure to an actinic radiation source, and which then brighten to a minimum transmission level of 75% when this light source is eliminated. These glasses are also characterized by a transmission of less than 63% when the exposure to light occurs at a temperature of 40° C. From numerous examples given in this invention, it appears that the thermal dependence of the transmission in the darkened state increases very significantly when the transmission in the darkened state at 25° C. is decreased. Typically, a difference is much larger than 18.5 points of transmission exists between 25 and 40° C., whereas the transmission in the darkened state at 25° C. is less than 30%, measured at a thickness of 2 mm.

It would be useful to have available a photochromic glass for ophthalmic use, with a refractive index of approximately 1.5, presenting the following properties:

(a) a high transmission $T_0$ in the clear state, typically more than 86%, preferably more than 88%, at a thickness of 2 mm, and essentially associated with the absence of coloration;

(b) a transmission $T_{d15(25° C.)}$ in the darkened state, after 15 min of exposure at 25° C. to a sunlight-simulation device, of less than 35% at a thickness of 2 mm;

(c) a transmission $T_{d15(40° C.)}$ in the darkened state, after 15 min of exposure at 40° C. to a sunlight-simulation device, of less than 45% at a thickness of 2 mm;

(d) a transmission of more than 75% after 1 h of illumination in the absence of actinic radiation; and (e) a stability of the photochromic properties with respect to the thermal treatment used in the antiglare treatments, such that the difference between the values $T_{d15(25° C.)}$ of the initial value and that of the glass after thermal treatment of 1 h at 280° C. does not exceed 5 transmission points, in absolute value.

Such a photochromic glass does not exist today, to the knowledge of the applicant.

BRIEF SUMMARY OF THE INVENTION

The objective of the present invention, therefore, is to provide glasses having the above-mentioned characteristics. More specifically, the invention concerns glasses whose matrix has a composition, expressed in wt % based on the oxides, within the following ranges:

| | |
|---|---|
| $SiO_2$ | 51–66 |
| $B_2O_3$ | 15–23 |
| $Al_2O_3$ | 3–10 |
| $ZrO_2$ | 2.5–11 |
| $TiO_2$ | 0–1 |
| $Li_2O$ | 3–7 |
| $Na_2O$ | 0–8 |
| $K_2O$ | 2–9 |
| $MgO$ | 0–3 |
| $CaO$ | 0–3 |
| $SrO$ | 0–3 |
| $BaO$ | 0–3 |
| $Nb_2O_5$ | 0–1 |
| $La_2O_3$ | 0–8 |
| $Y_2O_3$ | 0–8 | and containing, in addition, the following photochromic agents:

| | |
|---|---|
| Ag | 0.080–0.30 |
| CuO | >0.0020–0.0130 |
| Cl | 0.1–0.6 |
| Br | 0.040–0.3 | with the proportions of these agents being expressed in wt % with respect to the matrix, and the composition of the glasses, also, satisfy the following conditions:

$0.2 < Ag/(Cl+Br) \leq 0.5$ $Br/(Cl+Br) > 0.15$ $0.5 \leq La_2O_3 + Y_2O_3 \leq 8$ $TiO_2 + Nb_2O_5 \leq 1.2$ $10 \leq Al_2O_3 + ZrO_2 \leq 17$ $MgO + CaO + SrO + BaO \leq 6$

DESCRIPTION OF THE INVENTION

To reach the desired photochromic properties, the content of $B_2O_3$ must be greater than 15%, but because of a negative effect on the chemical hardness of the glass, this content shall preferably be maintained below 23%. The alumina can be added to the composition to improve the chemical durability of the glass, but with more than 10% of this oxide, the tendency of the glass to undergo devitrification is increased.

The refractive index can be corrected to the standard value of 1.523 by adjusting the concentrations of the oxides of alkaline earth metals, $TiO_2$, $ZrO_2$ and the oxides of heavy metals such as $Nb_2O_5$, $La_2O_3$ and $Y_2O_3$. However, the oxides of titanium and niobium can lead to a yellowish coloration in the clear state, which is undesirable; therefore, their levels will be limited to respective maximum concentrations contents of 1%. Their sum should not exceed 1.2%. Preferably, they should be absent from the formulation.

The zirconium oxide does not produce the coloring effect mentioned for titanium oxide and, therefore, it is an essential constituent to be incorporated at a concentration of at least 2.5%. Moreover, this oxide participates in the improvement of the chemical durability of the glass. However, at a high content, it can induce difficulties during melting, and as a result the use is limited to a maximum concentration of 11%.

To facilitate the melting and to raise the refractive index, oxides of alkaline earth metals, such as MgO, CaO, SrO, or BaO, can be added to the composition. However, given the negative impact on the photochromic properties observed with the increase in the quantity of these oxides, particularly the recorded rapid decrease in the capacity to retain to the clear state, the total content of oxides of alkaline earth metals must be maintained below 6%; preferably, it should be zero.

The refractive index is adjusted using $La_2O_3$ and/or $Y_2O_3$, which generally have little or no effect on the photochromic performance. At least 0.5% of $La_2O_3$ and/or $Y_2O_3$ is required to obtain an appropriate refractive index. However, because of the consequences resulting from the introduction of these oxides into the composition, on the density and the cost, respectively, their total content should be limited to 8%. It is preferred to use $La_2O_3$, for reasons of cost.

Preferred glasses have a matrix whose composition is, in wt %:

| | |
|---|---|
| $SiO_2$ | 51–59 |
| $B_2O_3$ | 17–22 |
| $Al_2O_3$ | 5–8 |
| $ZrO_2$ | 3–8 |
| $Li_2O$ | 3–5 |
| $K_2O$ | 5–9 |
| $La_2O_3$ | 0.7–4 |

To obtain the desired photochromic effect and to facilitate the melting, the oxides of alkali metals are included in the composition. The latter also allow a chemical tempering treatment to be carried out on the glass to impart to the glass a sufficient mechanical resistance for the application considered. For this purpose, the use of $Li_2O$ is recommended because of the facility with which Li ions can be exchanged by more voluminous ions. $Na_2O$ and $K_2O$ can clearly be used to adapt the viscosity so as to facilitate the manufacturing conditions.

The tint of the glasses of the invention in the darkened state is naturally gray. However, if a brown coloration is desired, it can easily be obtained by introducing, into the composition in the standard manner, colorant such as Pd and/or Au in the amount of one to six parts per million (ppm) and/or reducing agents such as $Sb_2O_3$, $As_2O_3$, $SnO_2$, and SnO at contents of 0.001–0.5% each.

The desired photochromic properties are obtained for analytical concentrations of silver, chlorine, bromine, and copper oxide within the claimed ranges.

The glasses of the invention were manufactured in the laboratory under the following conditions. The mixture of the standard raw materials for this type of glass was melted in a platinum crucible at a temperature of 1250° C. for 120 min. It is then heated to a temperature of approximately 1380° C., in the presence of a stirrer that allows the homogenization of the glass and its refinement. After the completion of the refinement operation, the glass is cast in the form of bars and reheated at the reheating temperature of approximately 500° C. These bars are then subjected to a heat treatment during which the photochromic properties of the glass are developed. It is, in particular, during this treatment that the precipitation of silver halide particles, which are the cause of the photochromism, occurs. A heat cycle of the photochromism typically comprises a temperature rise up to a threshold of approximately 15 min, at approximately 600–650° C.

The photochromic glass so obtained can then be characterized by the standard methods used for photochromic ophthalmic glasses.

The photochromic performance is measured in a sunlight-simulation device equipped with a light source whose spectrum is close to that of the sun. The parameters so obtained, and referenced in the present invention, are the transmission in the clear state, $T_0$: the transmission after 15 min of exposure to the light of the sunlight-simulation device, $Td_{15}$, measured at 0° C., 25° C., and 40° C.; the transmission after 60 min ($Tf_{60}$) of illumination, after the end of the exposure to the sunlight-simulation device. All these measurements are carried out on samples having a thickness of 2 mm. The refractive index of the glass, $n_d$, Was also measured using methods that are standard in this field.

The behavior of the glasses of the invention in antiglare treatments, which are frequently applied to photochromic lenses is determined by a simulation test consisting of heating the glass to be tested for 1 h at 280° C., and measuring the value $T_{d15(25° C.)}$ before and after said heating. The difference between these values is recorded $D-T_{d15(TSV)}$ in Table II below.

Table I below gives a few examples of compositions of glasses made according to the invention and not made according to the invention, whereas Table II indicates various properties of these glasses. The notations $D-T_{d15(40-25)}$ and $D-T_{d15(40-0)}$ represent the difference between the $T_{d15}$ measured at 40° C. and 25° C., on the one hand, and at 40° C. and 0° C., on the other hand.

In these examples, the constituents of the matrix of the glass are expressed in weight percentages based on the oxides, with their total being 100%. Insofar as the photochromic constituents are concerned, the proportion of the colorants and the reducing agents proportions are indicated in wt % with respect to the matrix. In addition, given that the cation(s) with which the halogens combine is not known, and given that the proportions of the latter are very low, Cl and Br are simply expressed in the form of chlorine and bromine according to the usual practice. Finally, because silver is present in such a small quantity, it is also simply mentioned in its elementary form. The actual ingredients of the charge can be any materials, whether they are oxides or other compounds, that, once molten, are converted into the desired oxides in the correct proportions.

In the examples of Table I, Examples 5, 8, and 16 are not according to the invention. Example 1 corresponds to a glass with a gray color. Examples 2–16 correspond to glasses with a brown color. Example 5 (not according to the invention) illustrates the unfavorable effect on the photochromic properties, particularly $T_0$ and $T_{f60}$, of an excessive $La_2O_3$ content. Example 8 (not according to the invention) illustrates the fact that an excessively high CuO content does not allow the obtention of a sufficient darkening at 40° C. Example 16 (not according to the invention) illustrates the fact that the required compositions for the ratios Ag/(Cl+Br) and Br/(Cl+Br) are not satisfied, and a glass is obtained whose photochromic properties are not stabilized with respect to the heat treatment of the antiglare treatments.

In addition to the production of ophthalmic lenses, the glasses of the invention can also be used for the preparation of the windows glasses of vehicles or buildings.

TABLE I

|  | 9 | 10 | 11 | 12 | 13 | 14 | 15 | 16 |
|---|---|---|---|---|---|---|---|---|
| $SiO_2$ | 54.8 | 54.8 | 54.8 | 54.8 | 51.8 | 51.8 | 51.8 | 51.8 |
| $B_2O_3$ | 18.5 | 18.5 | 18.5 | 18.5 | 21.8 | 21.8 | 21.8 | 21.8 |
| $Al_2O_3$ | 7.2 | 7.2 | 7.2 | 7.2 | 7.4 | 7.4 | 7.4 | 7.4 |
| $ZrO_2$ | 5 | 5 | 5 | 5 | 3.9 | 3.9 | 3.9 | 3.9 |
| $Li_2O$ | 3.2 | 3.2 | 3.2 | 3.2 | 3.3 | 3.3 | 3.3 | 3.3 |
| $Na_2O$ | 0 | 0 | 0 | 0 | 0 | 0 | 0 | 0 |
| $K_2O$ | 8.1 | 8.1 | 8.1 | 8.1 | 8.4 | 8.4 | 8.4 | 8.4 |
| MgO | 0 | 0 | 0 | 0 | 0 | 0 | 0 | 0 |
| CaO | 0 | 0 | 0 | 0 | 0 | 0 | 0 | 0 |
| SrO | 0 | 0 | 0 | 0 | 0 | 0 | 0 | 0 |
| BaO | 0 | 0 | 0 | 0 | 0 | 0 | 0 | 0 |
| $TiO_2$ | 0 | 0 | 0 | 0 | 0 | 0 | 0 | 0 |
| $NB_2O_5$ | 0 | 0 | 0 | 0 | 0 | 0 | 0 | 0 |
| $La_2O_3$ | 3.2 | 3.2 | 3.2 | 3.2 | 3.4 | 3.4 | 3.4 | 3.4 |
| $Y_2O_3$ | 0 | 0 | 0 | 0 | 0 | 0 | 0 | 0 |
| Ag | 0.123 | 0.121 | 0.121 | 0.121 | 0.147 | 0.151 | 0.149 | 0.252 |
| Cl | 0.300 | 0.308 | 0.308 | 0.308 | 0.322 | 0.332 | 0.321 | 0.452 |
| Br | 0.057 | 0.059 | 0.059 | 0.059 | 0.061 | 0.067 | 0.063 | 0.045 |
| CuO | 0.0110 | 0.0050 | 0.0050 | 0.0050 | 0.0070 | 0.0090 | 0.0100 | 0.0090 |
| Pd | 0.0004 | 0.0004 | 0.0004 | 0.0004 | 0.0004 | 0.0004 | 0.0004 | 0.0003 |
| $Sb_2O_3$ | 0 | 0.5 | 0.5 | 0.5 | 0 | 0 | 0 | 0 |
| Ag/ (Cl—Br) | 0.34 | 0.28 | 0.28 | 0.28 | 0.38 | 0.38 | 0.39 | 0.51 |
| Bzl/ (Cl—Br) | 0.16 | 0.20 | 0.20 | 0.20 | 0.16 | 0.17 | 0.16 | 0.09 |

TABLE II

| | 1 | 2 | 3 | 4 | 5 | 6 | 7 | 8 |
|---|---|---|---|---|---|---|---|---|
| Photochromism treatment (temp., °C. duration, min) | 650/15 | 650/15 | 650/15 | 650/15 | 650/15 | 650/15 | 650/15 | 650/15 |
| Index | 1.524 | — | — | — | 1.526 | 1.525 | — | — |
| Abbe No. | 60.1 | — | — | — | 62.5 | 60.7 | — | — |
| Density | 2.3 | — | — | — | 2.5 | 2.4 | — | — |
| $T_0$ | 91.4 | 89.2 | 90.4 | 87.9 | 77.1 | 89.3 | 89.4 | 89.5 |
| $Td_{15}$ (0° C.) | 18.1 | 19.1 | 23.6 | 24.7 | 27.5 | 10.0 | 8.6 | 7.5 |
| $Td_{15}$ (25° C.) | 22.2 | 24.0 | 30.3 | 29.1 | 28.1 | 15.5 | 17.3 | 20.0 |
| $Td_{15}$ (40° C.) | 37.0 | 40.7 | 43.8 | 37.8 | 33.2 | 34.5 | 39.9 | 46.3 |
| $Tf_{60}$ | 85.6 | 86.9 | 83.1 | 76.6 | 46.7 | 78.8 | 79.6 | 80.8 |
| Colorimetric coordinates | | | | | | | | |
| $x_0^{(a)}$ | 0.3109 | 0.3167 | 0.3157 | 0.3156 | 0.3292 | 0.3182 | 0.3178 | 0.3180 |
| $y_0^{(a)}$ | 0.3187 | 0.3351 | 0.3342 | 0.3349 | 0.3470 | 0.3362 | 0.3362 | 0.3366 |
| $y_{15}^{(b)}$ | 0.3153 | 0.3667 | 0.3282 | 0.3328 | 0.3347 | 0.3785 | 0.3745 | 0.3629 |
| $Y_{15}^{(b)}$ | 0.3160 | 0.3555 | 0.3332 | 0.3372 | 0.3426 | 0.3475 | 0.3485 | 0.3454 |
| $D\_Td_{15}$ (TSV) | — | — | — | — | — | 1.2 | 0.5 | 0.6 |
| $D\_Td_{15}$ (40-25) | 14.8 | 16.7 | 13.5 | 8.7 | 5.1 | 19.0 | 22.6 | 26.3 |
| $D\_Td_{15}$ (40-0) | 18.9 | 21.6 | 20.2 | 13.1 | 5.7 | 24.5 | 31.3 | 38.8 |

| | 9 | 10 | 11 | 12 | 13 | 14 | 15 | 16 |
|---|---|---|---|---|---|---|---|---|
| Photochromism treatment (temp., °C. duration, min) | 630/15 | 630/15 | 630/15 | 610/15 | 610/15 | 610/15 | 610/15 | 650/15 |
| Index | 1.524 | — | — | — | 1.523 | — | — | — |
| Abbe No. | 60.1 | — | — | — | 61.3 | — | — | — |
| Density | 2.3 | — | — | — | — | — | — | — |
| $T_0$ | 88.1 | 89.2 | 89.8 | 90.9 | 90.5 | 91.1 | 90.9 | 89.4 |
| $Td_{15}$ (° C.) | 8.9 | — | 25.8 | — | — | — | — | 10.4 |
| $Td_{15}$ (25° C.) | 19.3 | 26.4 | 26.5 | 28.8 | 22.9 | 19.4 | 21.0 | 16.4 |
| $Td_{15}$ (40° C.) | 42.5 | 36.2 | 34.1 | 41.7 | 41.7 | 39.4 | 44.4 | 32.7 |
| $Tf_{60}$ | 78.6 | 76.7 | 77.5 | 81.4 | 83.2 | 82.5 | 84.0 | 82.0 |
| Colorimetric coordinates | | | | | | | | |
| $x_0^{(a)}$ | 0.3184 | 0.3171 | 0.3168 | 0.3160 | 0.3163 | 0.3162 | 0.3157 | 0.3174 |
| $y_0^{(a)}$ | 0.3366 | 0.3354 | 0.3350 | 0.3343 | 0.3347 | 0.3351 | 0.3344 | 0.3341 |
| $y_{15}^{(b)}$ | 0.3362 | 0.3446 | 0.3548 | 0.3388 | 0.3549 | 0.3479 | 0.3363 | 0.3798 |
| $Y_{15}^{(b)}$ | 0.3367 | 0.3421 | 0.3475 | 0.3378 | 0.3466 | 0.3428 | 0.3378 | 0.3341 |
| $D\_Td_{15}$ (TSV) | 0.3 | −1.4 | −1.1 | 1.4 | −2.6 | −1.7 | −3.0 | 5.0 |
| $D\_Td_{15}$ (40-25) | 23.2 | 9.8 | 7.6 | 12.4 | 18.8 | 20.0 | 23.4 | 16.3 |
| $D\_Td_{15}$ (40-0) | 33.6 | — | 8.3 | — | — | — | — | 22.3 |

(a) initially
(b) after 15 min. of exposure to the sunlight-simulation devic

What is claimed is:

1. A photochromic glass having a refractive index of approximately 1.5 and presenting the following properties:

(a) a transmission $T_0$ greater than 86% at a thickness of 2 mm, and essentially associated with an absence of coloration, (b) a transmission $T_{d15(25° C.)}$, after 15 minutes of exposure at 25° C. to a sunlight-simulation device, that is less than 35% at a thickness of 2 mm, (c) a transmission $T_{d15(400° C.)}$, after 15 minutes of exposure at 40° C. to a sunlight-simulation device, that is less than 45% at a thickness of 2 mm, (d) a transmission greater than 75% after an hour of illumination absent actinic radiation, (e) the difference between the $T_{d15(25° C.)}$ initial value of the glass and the $T_{d15(25° C.)}$ of the glass after exposure for 1 hour at 280° C. in an antiglare treatment being not over 5 transmission points, (f) the glass composition, exclusive of photochromic agents, essentially consisting of, expressed in weight % on an oxide basis:

| | |
|---|---|
| $SiO_2$ | 51–66 |
| $B_2O_3$ | 15–23 |
| $Al_2O_3$ | 3–10 |
| $ZrO_2$ | 2.5–11 |
| $TiO_2$ | 0–1 |
| $Li_2O$ | 3–7 |
| $Na_2O$ | 0–8 |
| $K_2O$ | 2–9 |
| MgO | 0–3 |
| CaO | 0–3 |
| SrO | 0–3 |
| BaO | 0–3 |
| $Nb_2O_5$ | 0–1 |
| $La_2O_3$ | 0–8 |
| $Y_2O_3$ | 0–8, |

(g) the glass composition containing, in addition, the following photochromic agents, expressed in weight %:

| | |
|---|---|
| Ag | 0.080–0.30 |
| CuO | >0.0020–0.0130 |
| Cl | 0.1–0.6 |
| Br | 0.040–0.3, |

(h) the glass composition, as expressed in weight %, satisfying, in addition, the following conditions:

$0.2 < Ag/(Cl+Br) \leq 0.5$ $Br/(Cl+Br) > 0.15$ $0.5 \leq La_2O_3 + Y_2O_3 \leq 8$ $TiO_2 + Nb_2O_5 \leq 1.2$ $10 \leq Al_2O_3 + ZrO_2 \leq 17$ $MgO + CaO + SrO + BaO \leq 6.$ 2. A photochromic glass according to claim 1, that presents a gray tint after exposure to actinic radiation.

3. A photochromic glass according to claim 1 that presents a brown tint after exposure to actinic radiation and that contains, in addition, at least one constituent selected from the group consisting of Pd, Au, $Sb_2O_3$, $As_2O_3$, $SnO_2$ and SnO in a proportion of 1–6 parts per million of Pd, Au and mixtures of Pd and Au and 0.001–0.5% of $Sb_2O_3$, $As_2O_3$, $SnO_2$ SnO and mixtures thereof.

4. A photochromic glass according to claim 1 that is essentially free of $TiO_2$, MgO, CaO, SrO, BaO and $Nb_2O_3$.

5. A photochromic glass according to claim 1 that is essentially free of $Y_2O_3$.

6. A photochromic glass according to claim 1 that has a transmission greater than 88% at a thickness of 2 mm.

7. A photochromic glass according to claim 1 that has a composition consisting essentially of, in weight %, and exclusive of photochromic agents, on an oxide basis:

| | |
|---|---|
| $SiO_2$ | 51–59 |
| $B_2O_3$ | 17–22 |
| $Al_2O_3$ | 5–8 |
| $ZrO_2$ | 3–8 |
| $Li_2O$ | 3–5 |
| $K_2O$ | 5–9 |
| $La_2O_3$ | 0.7–4. |

8. A lens consisting of photochromic glass as defined according to any one of claims 1–7.

* * * * *